UNITED STATES PATENT OFFICE.

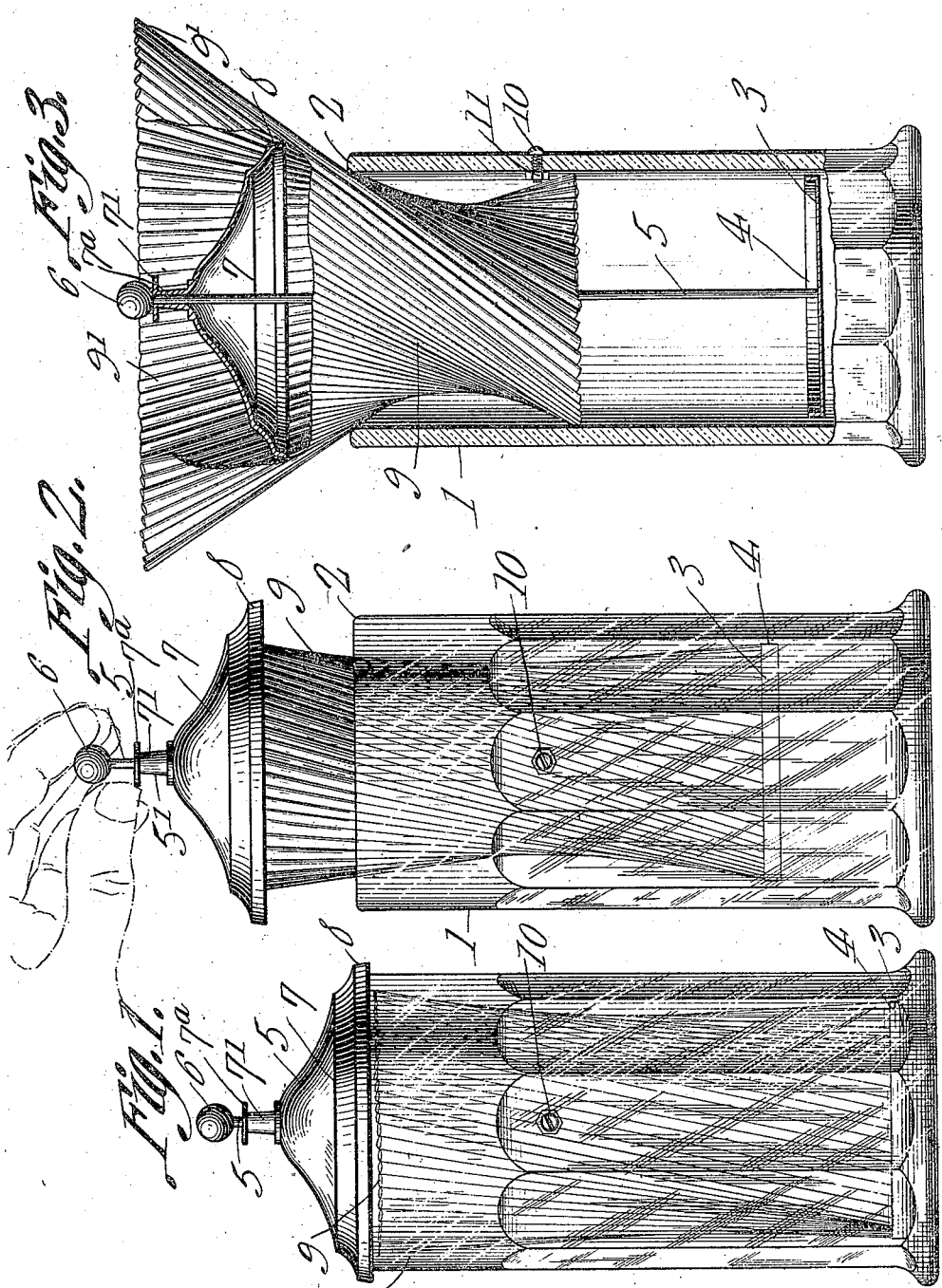

WILLIAM J. EISENHARDT, OF BALTIMORE, MARYLAND.

STRAW-HOLDER.

1,014,866.  Specification of Letters Patent.  Patented Jan. 16, 1912.

Application filed June 8, 1911. Serial No. 631,962.

*To all whom it may concern:*

Be it known that I, WILLIAM J. EISENHARDT, a citizen of the United States, residing at Baltimore, State of Maryland, have invented a new and useful Straw-Holder, of which the following is a specification.

This invention relates to improvements in straw holders, and the primary object of the invention is the provision of a device for holding and dispensing straws at soda water and drinking fountains or the like, the said device consisting primarily of a transparent ornamental holder or receptacle in which is adapted to be removably admitted a rod carrying a tray, the said tray co-acting with a cover slidably mounted upon the rod to retain the straws between the said tray and cover when the straws are inserted into or removed from the transparent receptacle, or to coact to hold the straws between the cover and open mouth of the receptacle whereby the ends of the straws are disposed in a circle and separated so as to render the easy removal of a single straw without interfering with or contaminating the adjacent straws.

A further object of this invention is the provision of a circular tray carried by a rod, the said rod being provided at its upper end with a lifting knob and limiting means for the cover which is slidably mounted upon said rod, said tray and cover being provided with flange portions which provide a receptacle when the device is lifted by the knob to retain the straws between the tray and cover, and when the tray is placed within a receptacle, the said cover will close the receptacle and permit the straws to rest upon the tray substantially at the bottom of the receptacle.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a side elevation of the complete device in closed position. Fig. 2 is a side elevation of the device in the position the parts assume when being removed from or placed within the transparent receptacle. Fig. 3 is a vertical sectional view through the cover and tray and glass receptacle with the cover holding the straws in dispensing position.

Referring to the drawings the numeral 1 designates the ornamental holding device or receptacle which is preferably made of glass so that the straws 9 therein may be seen at all times, and so that the said receptacle may be cleaned and be displayed upon the counter or tables used in connection with the dispensing of soda water and the like. The open portion of the receptacle 1 is provided with a rounded edge 2 at its mouth the purpose of which will presently appear. Adapted to fit within the receptacle is a circular tray 3 provided with the upturned annular rim 4, and secured concentrically of this tray 3 and projecting upwardly therefrom is a cylindrical rod 5 carrying at its upper end, the spherical knob or handle 6. Slidably mounted upon this rod 5 is a cover or lid 7 having the sleeve 7', which provides a gripping means to lift the cover and the complete device when it is desired to place the straws 9 in the position for dispensing as clearly shown in Fig. 3. The outer edge or periphery of the cover 7 is a downwardly projecting flange 8, which is of a greater diameter than the outer diameter of the mouth of the receptacle 1, so that when the device is in closed position, the said flange 8 will encircle the mouth of the receptacle 1 and thereby close the said receptacle and the straws within, as clearly shown in Fig. 1 of the drawings.

When it is desired to remove the straws from the receptacle 1 and permit the receptacle to be cleaned or additional straws to be placed therein, the knob 6 is grasped as shown in Fig. 2 of the drawings and the complete device may be lifted carrying with it the tray 3 and the straws 9, whose upper end will engage the cover within the flange 8, the weight of the cover holding the straws in such position, so that the device with the straws may be lifted bodily from the receptacle 1, or may be placed therein.

When it is desired to cause the straws to assume the dispensing position as shown in Fig. 3 of the drawings, the entire receptacle with the holding device and cover is placed upon its side, so that the straws 9 will fall in bulk to one side within the tray 3 and the cover 7, the receptacle is then righted, and the knob 6 is then grasped and a twirling action is given the rod 5 and tray 3, the friction between straws at the tray 3 and walls of holder 1, where the straws' ends engage the same, will cause the straws to assume the spiral position as shown in the drawings. The sleeve 7' is now grasped so as to raise the cover until the said sleeve engages the knob 6, a continued movement of the same will lift the rod 5 and the tray 3 and when the straws' ends below the cover 7 emerge from the mouth of the receptacle their sides will be guided upon the curved portion 2 of the receptacle 1 and a continued movement of the device upwardly will cause the straws to assume the position as shown in Fig. 3, at which time the cover 7 and the knob 6 are permitted to fall lightly and engage the straws upon their inner face above their contact with the mouth 2 of the receptacle 1, the weight of the tray 3, rod 5, cover 7 and knob 6 holding the straws in dispensing position as clearly indicated in Fig. 3.

To limit the upward movement of the tray 3, the removable screw stop 10, is mounted in and through the wall of the holder or dispenser 1, the inner end 11, being in the path of the rim 4, of the tray 3, and is placed in such position, after the tray has been inserted in the holder. By this means the straws 9 are inserted into the tray 3 and holder 1, by lifting the tray by the disk 7ª, to present sufficient space below the cover and upper edge of the holder 1 for the insertion of said straws. It will thus be seen that when the straws assume the positions as indicated in Fig. 3 there are no double layers of straws, and that the projecting ends 9' thereof will assume the position to permit the party desiring the straws to select the one desired and without in any way touching the remaining straws, thus providing a neat and sanitary device for dispensing straws.

What is claimed is:

1. A dispenser of this character, comprising a substantially cylindrical receptacle, a circular tray, a rod mounted concentrically thereof and having a knob at its upper end, and a cover slidably mounted upon the rod.

2. A dispenser of this character, having a circular tray, a rod, a cover having a rim disposed toward the tray, and slidably mounted upon the rod, and a knob carried at the other end of the rod.

3. A dispenser of this character, comprising a substantially cylindrical receptacle, a circular tray having an upwardly projecting annular rim, a rod mounted concentrically thereof, a knob provided at its upper end, and a cover having a sleeve slidably mounted upon said rod between the tray and the knob.

4. A dispenser of this character, comprising a substantially cylindrical receptacle, a circular tray having an upwardly projecting annular rim, a rod mounted concentrically thereof, and of length sufficiently to project above the mouth of the receptacle, and a slidably mounted cover for the receptacle carried upon the rod and of a greater diameter than the mouth of the receptacle.

5. A dispenser of this character, comprising a receptacle, and a straw holder adapted to removably fit the said receptacle, and comprising a tray of lesser diameter than the opening of the receptacle, a rod connected concentrically thereof and adapted to project exteriorly of the receptacle, and a cover of greater diameter than the mouth of the receptacle, slidably mounted upon said rod.

6. A dispenser of this character, comprising a tray having an upwardly projecting annular rim, a rod mounted concentrically thereof, a knob carried at the opposite end of the rod, and a disk cover slidably mounted upon said rod and provided with an annular flange opposed to the annular rim of the tray.

7. A straw dispenser, comprising a circular tray provided with an annular upwardly projecting rim, a cylindrical rod carried thereby, a knob carried at the opposite end of said rod, and a disk of greater diameter than the tray provided with a flange projecting oppositely to the flange of the tray, said disk being slidably mounted upon the rod between the tray and the knob.

8. A removable straw dispenser, comprising a circular tray, a rod carried by the tray, a handle on the upper end thereof, and a disk slidably mounted upon the rod between the handle and the tray.

In testimony that I claim the foregoing as my own, I have hereto affixed my signature in the presence of two witnesses.

WILLIAM J. EISENHARDT.

Witnesses:
HENRY LINBERGER,
JNO. O. WISE.